350-166

Sept. 3, 1957 B. J. EDWARDS ET AL 2,804,803

VARIABLE COLOR FILTER FOR COLOR TELEVISION

Filed April 6, 1954

Inventors
Baden J. Edwards
David M. Johnstone
By [signature]
Attorney

1

2,804,803

VARIABLE COLOR FILTER FOR COLOR TELEVISION

Baden John Edwards, Cambridge, and David Malcolm Johnstone, London, England, assignors to Pye Limited, Cambridge, England, a British company Application April 6, 1954, Serial No. 421,232

(Filed under Rule 47(a) and 35 U. S. C. 116)

7 Claims. (Cl. 88—106)

This invention relates to colour television and is a continuation-in-part application of our copending application No. 131,566, filed December 17, 1949, and now abandoned. In the evolution of colour television systems which utilize the scanning principle for colour image analysis at the transmitter and for colour image reconstitution at the receiver, it has been proposed to use a separate camera pick-up tube and receiving cathode ray tube together with a separate channel for the transmission of each colour component, and it has also been proposed to switch separate tubes for each colour component sequentially on a common channel. With such systems, there are the difficulties of obtaining accurate simultaneous registration of the primary colour pictures in the pick-up tubes and in the receiving tubes, and at the present state of knowledge in the art, these difficulties have not been successfully overcome. Therefore, development in the art has favoured the more straightforward scanning methods using single channel transmission and a single pick-up tube and receiver tube in conjunction with suitable colour filters. Attempts to utilize fixed or stationary colour filters of the mosaic or lined types in conjunction with methods of scanning in which, in the one case each picture point, and in the other case each picture line, is scanned successively in the primary colours, have not been entirely successful, again owing to the difficulties of obtaining accurate registration between the picture on the screen of the receiving tube and the colour mosaic or colour lined filter. Consequently, synchronized mechanically rotated colour filters (discs or drums) are used in conjunction with methods of scanning each picture frame successively in each of the primary colours.

An object of the present invention is to obviate, in colour television, the use of mechanically rotating colour filters and to replace such colour filters by a more compact form of colour filter having no moving parts. Another object is to provide an electronic device for producing the required colour selection sequence for colour television.

It is known that when a beam of light is projected on to a translucent medium in the form of a thin film having reflecting front and back surfaces, different colours are produced in the reflected beam by interference between the rays partially reflected at the incident surface of the medium and the rays reflected from the back surface, and the colour obtained in the reflected beam depends upon the thickness of the medium or the angle of incidence of the beam. Colour filters may, therefore, be constructed utilizing this principle. Similar colour interference filters are also known in which the light is transmitted through the medium of the filter instead of being reflected therefrom. The present invention makes use of these known scientific facts for effecting improvements in colour television.

In using this invention, television in colour is effected by analyzing the image at the transmitter with a single camera pick-up tube operating in conjunction with a colour interference filter, and similarly reconstituting the image at the receiver by a single picture reconstituting device, such as a cathode ray tube, operating in conjunction with a colour interference filter similar to that at the transmitter, and selecting and varying the colour transmission or reflection characteristics of the interference filters at the transmitter and receiver in synchronism so as to vary in synchronism the colours transmitter or reflected by the filters during the picture scanning and reconstituting process at the transmitter and receiver, whereby the colour components transmitted by the pick-up tube are correspondingly reproduced by the picture reconstituting device. The variation of the colour selection (colour transmission or reflection) characteristics of the interference filters is obtained by varying the angle of incidence of the light on the media, and this variation of angle of incidence is carried out by the applied waveform. For synchronising the filters at the transmitter and receiver, suitable synchronising pulses are employed, which may be the line or frame synchronising pulses ordinarily employed in television systems.

The colour interference filter utilized in carrying out this invention comprises a carrier medium containing laminated particles possessing iridescent properties which, by reason of their laminated structure, greatly increase the degree of colour saturation of the transmitted or reflected beam. The alternate laminations of each particle have a thickness of the order of about .5 micron and have different refractive indices. It is known that crystals of potassium chlorate may have these desired properties but it may be difficult to obtain such natural crystals with adequate uniformity. In order to overcome the difficulty of obtaining such crystals, a preferred form of the colour interference filter comprises a suspension of synthetically produced small iridescent particles, i. e. laminated particles consisting of alternate layers having different refractive indices, in a layer of an elastic carrier, such as gelatin. The particles are suspended in the carrier with the same orientation, which is produced in known manner by applying an electric field to the particles during the production of the filter, whereby, under the influence of the applied field, the particles tend to align themselves so that their longest axes are parallel. Each particle must be constructed in accordance with the known principles of an interference filter, the critical factors being thickness and refractive index of the particles themselves and, in addition, the refractive index of the carrier. The conditions satisfying these criteria are that the individual laminations be of the order of 0.5 micron thick and that the refractive indices of the individual laminations of each particle shall be different from each other. The surfaces of the filter layer thus produced are provided with electrodes, such as by coating each surface of the carrier with a thin transparent conducting metal film. Colour selection may then be obtained by controlling the orientation of the iridescent particles in the carrier, and hence the angle of incidence of the light incident upon the filter particles, by means of a variable controlling electric field produced by applying a variable potential difference between the electrodes of the filter. Such a filter can only be used substantially in the image or object planes since it will tend to be dispersive. For successful operation, the light rays incident upon the filter, both at the transmitter and at the receiver, should be collimated before they fall on the filter.

It is well-known that particles which are assymmetrically arranged in a non-conducting medium are orientable when electric fields are applied to them and an example of orientation of such particles in a suitable medium, i. e. an insulating material or a substance having a high electrical resistance, is described in the specification of United States Letters Patent No. 1,963,496 filed by Edwin H. Land under Serial Number 651,952 on January 16, 1933. The laminated particles referred to above respond similarly. The production of laminated iridescent materials is also well-known, for example, in the construction of dichroic mirrors, several materials having different refractive indices being used in the production of such laminated materials. The construction of a dichroic mirror by the deposition of alternate layers of such materials as zinc sulphide, cryolite and metals upon a suitable support such as glass, is well-known. The laminated particles required in the practise of the present invention are obtained by breaking up such a known laminated structure into particles after removing the layers in a sheet from the support and dispersing the particles in an elastic supporting medium, such as gelatin. This breaking up is effected by any one of the conventional techniques, for example, by crushing and in so doing the longest axes of the particles produced will follow the planes of the laminations themselves owing to the laminated nature of the material.

The principle of operation of the filter is as follows. If a thin, transparent film of refractive index differing from the surrounding material has a thickness equal to an even number of quarter wavelengths of the incident light, destructive interference will occur between the waves reflected from the front and back of the film. Thus light of this wavelength will not be reflected but will be totally transmitted while light of other wavelengths will be partially reflected and thus less than the total incident light of these wavelengths will be transmitted. In this manner, the film acts as a rudimentary form of colour filter which can be considerably increased in effect by a laminated form of construction, as above described. The wavelength for which transmission is a maximum can be varied by altering the thickness of the film. This can be accomplished by rotating the film so that the incident light arrives at an oblique angle to its surface.

In the present invention, each iridescent particle forms a colour filter of this kind. The light spectrum passed by each particle, and hence by the filter as a whole, can be varied by altering the orientation of the particles by means of an electric field, as described. The reason for this is that, since the alternate laminations have different refractive indices, at the interface between two adjoining laminations, there is a reflection of the light wave and therefore, some wavelengths will be cancelled and others reinforced according to the path length of the incident waves. This path length varies with the angle of incidence and thus under the influence of the electric field. This fact is utilized in dichroic mirrors where the angle of incidence is 2°.

In order that the invention may be more clearly understood, reference is made to the accompanying diagrammatic drawings, in which.

Figures 1, 2, 3, 4:
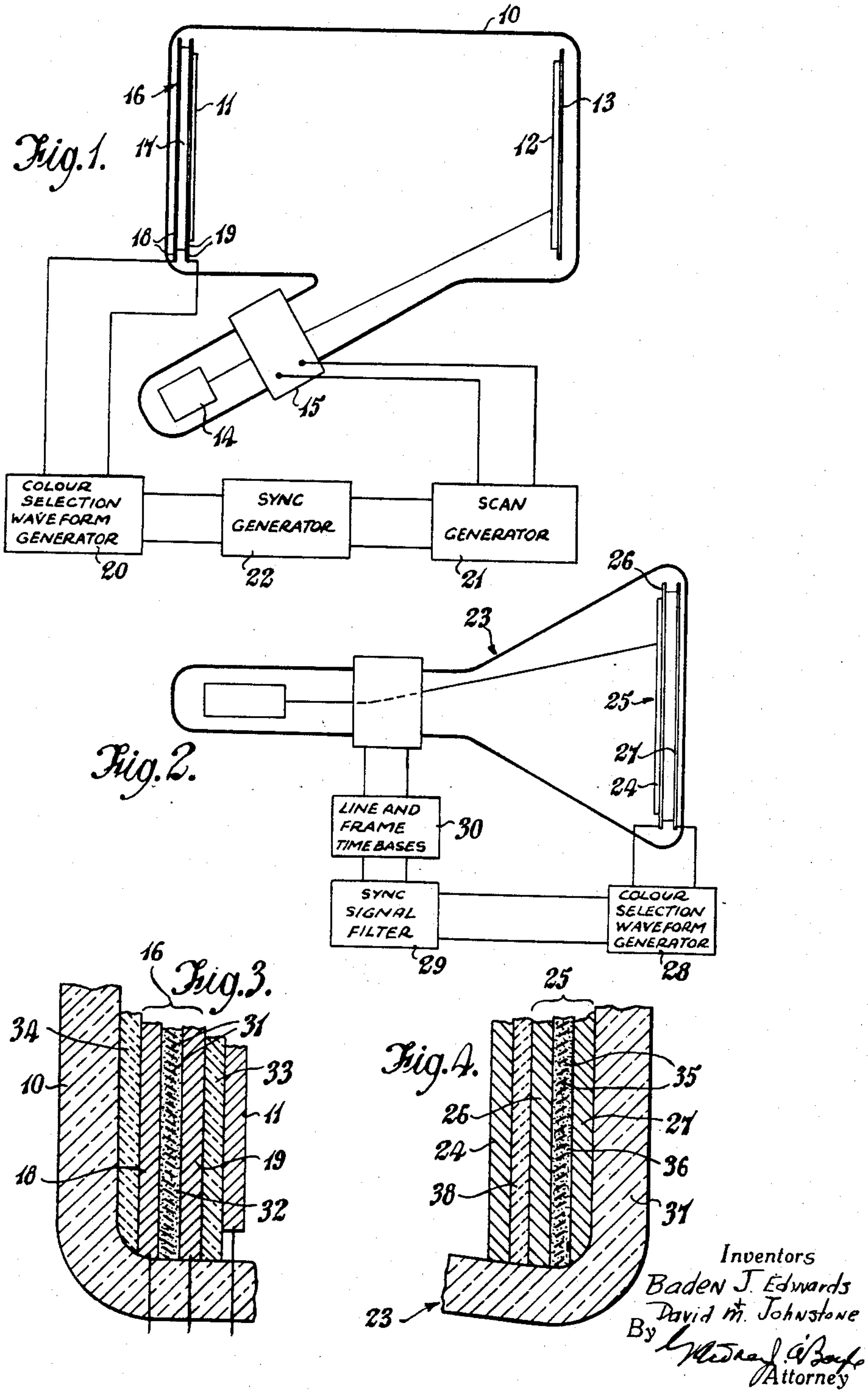
Fig. 1 is a diagram of a colour television camera pickup tube arrangement illustrating the principle of the invention.
Fig. 2 is a diagram of the corresponding receiving tube arrangement.
Figs. 3 and 4 are fragmentary diagrams illustrating a preferred form of colour filter incorporated in the pickup and receiving tubes respectively.

This invention is more particularly concerned with the provision of improved and simplified means for producing the necessary colour selection sequence in colour television, and accordingly may be carried into effect with any of the various types of storage tube known and used in the art, not being limited to any particular type of tube nor to any particular scanning process for development of the video signal waveform. Therefore, the fact that we have chosen to depict in Fig. 1 the utilization of a storage pick-up tube of the image iconoscope type in carrying out this invention, is without special significance, being purely illustrative. Briefly, typical parts of a tube of this type comprise, within an envelope 10, a transparent photo-cathode 11, a secondary emissive mosaic or target 12 backed by a signal plate 13, an electron gun 14 and deflecting means 15 for causing the beam emitted by the gun to scan the target. In the operation of the tube, an optical image of the subject for transmission is projected on to the photo-cathode 11 through the adjacent end wall of the envelope by means of a lens or optical system, not shown, and the beams of photo-electrons emitted from the photo-cathode and corresponding to the optical image projected thereon, is accelerated by any means known in the television art, such as a magnetic focussing and accelerating coil (not shown), and focussed on to the target 12 to form thereon a corresponding charge pattern which is neutralised by the scanning beam to develop the video signal which is taken off from the signal plate 13. Such phenomona are well-known and understood in the television art, and since they form no part per se of the present invention further explanation thereof is unnecessary here. Further description of this well-known apparatus has therefore been omitted so as not to confuse the invention with well-known techniques.

In utilizing this type of tube for colour television in accordance with the present invention, a colour interference filter denoted generally by 16 is arranged so that the light from the subject for transmission is projected on to the photo-cathode 11 through that filter. As earlier described herein, the filter 16 comprises a layer 17 of a medium capable of colour selection by variation of its colour transmission or reflection characteristics brought about by varying the angle of incidence of the light incident on the filter particles, such layer 17 being disposed between two transparent electrodes 18, 19 by means of which the required variation of the said angle of incidence to produce the required colour selection may be obtained electrically by application of a suitable electric field or waveform to those electrodes. The photo-cathode 11 is insulated from the adjacent electrode 19. The filter electrodes 18, 19 are connected to a colour control waveform generator 20 which is adapted to supply to the electrodes a waveform suitable to cause the filter medium 17 to vary its colour selection characteristics periodically and in the desired colour sequence, for instance, red, green, blue, so that images in the chosen colour components are projected in succession on to the photo-cathode 11 for conversion into corresponding colour charge image patterns on the target 12. With that arrangement, each picture frame is scanned successively in the selected colour components, such as the three primary colours mentioned. The generator 20 may be synchronised with the scanning generator 21 for the tube, under control of the synchronising signal generator 22. The generator 20 may produce a rectangular waveform, the amplitude of which is varied at frame frequency, i. e. for each colour scansion, to produce the desired colour selection sequence.

At the receiver, the receiving cathode ray tube 23 (Fig. 2) has associated with its fluorescent screen 24 a colour interference filter 25 which in all respects is similar to the filter 16 at the transmitter, the electrodes 26, 27 of the filter 25 being likewise connected to a colour control waveform generator 28 corresponding to the generator 20 at the transmitter and synchronised therewith, conveniently by employing the line or frame synchronising pulses which are separated at the synchronising signal filter 29 for controlling the line and frame time bases 30 of the receiver. When the receiver is operating, the filter 25 is illuminated by the flying light spot on the fluorescent screen 24, and the filter may be used as a direct viewing screen. The fluorescent screen 24 may be adapted for colour compensation by suitable selection of the fluorescent material of which it is composed so that, for example, the material has colour maxima in the red, green and blue regions at appropriate wavelengths to give the desired result.

The colour interference filters 16 and 25 are of the form, noted earlier herein, comprising a suspension of laminated iridescent particles in a layer of an elastic carrier, such as gelatin, provided with two transparent metallic films to constitute electrodes. As also earlier mentioned, certain natural potassium chlorate crystals may be found to have the required iridescent properties, but they may be difficult to obtain with adequate uniformity for the purpose of this invention. However, it is preferred to synthesise iridescent films by techniques similar to those employed in lens coating and the manufacture of dichroic mirrors, for example, by depositing alternate layers of different materials having different refractive indices chosen from the group comprising silica, metals, zinc sulphide, cryolite or sodium silicate each of which is equally suitable through a mesh upon a thin film of gelatin carrier to form iridescent particles of desired area and thickness which are afterwards covered with another thin film of the gelatin carrier.

In the preferred form, depicted in Fig. 3, the filter 16 comprises a suspension of laminated iridescent particles 31 in a suspension of a flexible or elastic carrier film 32 having a high electrical resistance.

Such a filter is made by depositing alternate layers of materials such as those referred to in the previous paragraph, upon a temporary support. The alternate layers have a thickness of the order of 0.5 micron and have different refractive indices. Any of the well-known techniques for coating lenses or making dichroic mirrors may be employed for this deposition process. After deposition, the combined laminations are removed from the temporary support and broken up into a large number of tiny particles but each particle will exhibit the laminated structure as it is not possible to separate such microscopically thin laminations, and therefore, each laminated particle will act in accordance with the well-known principles of an interference filter. The particles are then embedded in a gelatin film which is flexible and has a high electrical resistance and the opposite surfaces of this flexible carrier film are coated with thin, transparent metallic films 18, 19. The embedded particles are then oriented with their major axis parallel by the application of an electric field to the electrodes 18, 19, in the manner taught, for example, in the Land specification No. 1,963,-496, referred to above. After such orientation the filter is ready for use and is located in position in a transmitting tube, e. g., as shown in Fig. 1. If desired this preliminary orienting field may be applied after the filter has been located in the tube.

Connections are taken from the electrodes 18, 19 to the colour control waveform generator 20 in Fig. 1. The photo-cathode 11 is formed on a thin layer 33 of glass which insulates it from the electrode film 19 of the filter. The light from the subject to be transmitted reaches the opposite side of the filter through the glass end wall of the tube envelope 10 and through the transparent electrode film 18 of the filter.

The filter will tend to be dispersive and accordingly it is arranged substantially in the image plane. The angular distribution of the incident light on to the iridescent laminated particles 31 of the filter must be small compared with the angle of displacement of the particles required for colour selection, otherwise there will be loss of colour saturation. As the angular displacement of the particles is unlikely to be greater than about 60°, and as the angular distribution at the point focus of the camera tube lens is normally of the same order, it is preferable to arrange that the divergent rays from individual image points are scattered as little as possible before they fall on the filter. We have found that the provision of a very thin glass screen 34 inserted between the image and the filter 16, is helpful in reducing this scatter but cannot account for this on purely theoretical considerations.

Thus, it will be seen that since each iridescent laminated particle in the filter according to the invention is in effect a colour filter of the kind just described, tilting of each particle, with respect to the incident light, will cause the whole filter assembly to pass different coloured light in dependence upon the angles at which the particles are located with respect to the incident light. Since it has been shown that particles in a suitable medium can be orientated by the application of a suitable potential, it will be seen that the invention provides a filter for passing light of a specified colour in dependence upon the potential applied between the electrodes 18 and 19.

Fig. 4 depicts the corresponding arrangement in the receiver tube 23, the filter 25 of which, in the preferred form, is similar to that just described for the filter 16, and accordingly comprises a suspension of iridescent laminated particles 35, similar to the particles 31 of Fig. 3, having the same orientation, in the flexible carrier film 36 provided with electrode film coatings forming the electrodes 26 and 27, from which connections are taken to the colour control waveform generator 28 in Fig. 2. The filter 25 is arranged between the fluorescent screen 24 and the end face of the tube envelope 37, with the interposition of an anti-scatter glass screen 38 (similar to screen 34 in Fig. 3) between the fluorescent screen 24 and the filter 25 for reducing the scatter of the divergent rays from the moving light spot on the fluorescent screen before they fall on the filter, since here also, similarly as in the pick-up tube, the angular distribution of the light from the spot on the fluorescent screen 24 will normally be of the same order as the angular displacement of the iridescent particles 35 which is required for the colour selection.

By means of the invention, a colour television system is realized which requires only a single pick-up tube at the transmitter and only a single cathode ray tube or other picture reconstituting device at the receiver, each operating in conjunction with a fixed or stationary colour interference filter, colour selection of which is obtained electrically. The invention thus obviates the difficulties of synchronising mechanically rotating colour filters, and also the difficulties of other systems noted earlier herein.

We claim:

1. A colour filter comprising a plurality of transparent laminated iridescent particles planar in the long dimension suspended with the same orientation in a transparent elastic supporting film, each lamination having a thickness of about 0.5 micron and all the laminations having different refractive indices, whereby each particle exhibits the properties of an interference filter, and transparent metallic films forming electrodes on opposite sides of said film and insulated from each other thereby, for application of an electric field to said particles for varying their orientation in said film.

2. A colour filter comprising a plurality of iridescent particles planar in the long dimension, each comprising a plurality of transparent laminations having different refractive indices and a thickness of about 0.5 micron, suspended with the same orientation in a transparent elastic supporting film having a high electrical resistance and adapted for colour selection by interference, dependently upon the angle of incidence of the light impinging upon said particles, and transparent metallic films forming electrodes on opposite sides of said film and insulated from each other thereby, for application of an electric field to said particles for varying their orientation in said film.

3. A colour filter comprising a plurality of iridescent laminated particles planar in the long dimension, each comprising a plurality of transparent laminations having different refractive indices and a thickness of about 0.5 micron, said particles being embedded in a film of gelatin, and a transparent metal film on each of the opposite faces of said gelatin film.

4. A colour selection device for colour television comprising a plurality of iridescent particles planar in the long dimension, each comprising a plurality of transparent laminations, having different refractive indices and a thickness of about 0.5 micron, a transparent elastic film supporting said particles, and means for subjecting said particles to an electric field for influencing their orientation.

5. A colour selection device for colour television comprising a transparent elastic film having a high electrical resistance, a plurality of iridescent particles planar in the long dimension and susceptible to variation in their orientation by the influence of an external electric field, located in said film, said particles each comprising a plurality of transparent laminations having different refractive indices and a thickness of about 0.5 micron, and means for subjecting said particles to an electric field for influencing their orientation.

6. An electronic colour selection device for colour television comprising a stationary colour interference filter formed of laminated iridescent particles planar in the long dimension suspended with the same orientation in an elastic film, each particle comprising a plurality of transparent laminations having a thickness of about 0.5 micron and all the laminations having different refractive indices so that said filter is adapted for colour selection by interference dependently upon the angle of incidence of light impinging upon said particles, transparent electrodes on opposite sides of said carrier, and a waveform generator for applying a periodic varying electric field between said electrodes to vary the orientation of said particles in said film and thereby the angle of incidence of said light so as to cause the filter to select a set of colour components in a predetermined sequence periodically.

7. An electronic colour selection device for colour television comprising a stationary colour interference filter formed of a plurality of iridescent laminated particles planar in the long dimension, each particle comprising a plurality of transparent laminations having different refractive indices and a thickness of about 0.5 micron, said particles being embedded in a film of gelatin, a transparent metal film electrode on each of the opposite faces of said gelatin film, and a wavefrom generator connected to said metallic film electrode for applying a periodically varying electric field between said electrodes to vary the orientation of said particles in said gelatin film and thereby the angle of incidence of light impinging upon said particles, so as to cause the filter to select a set of colour components in a predetermined sequence periodically.

References Cited in the file of this patent

UNITED STATES PATENTS

| | | |
|---|---|---|
| 1,963,496 | Land | June 19, 1934 |
| 2,123,902 | Land | July 19, 1938 |
| 2,277,008 | Ardenne | Mar. 17, 1942 |
| 2,290,581 | Donal | July 21, 1942 |
| 2,481,621 | Rosenthal | Sept. 13, 1949 |
| 2,493,200 | Land | Jan. 3, 1950 |

FOREIGN PATENTS

| | | |
|---|---|---|
| 419,295 | Great Britain | Nov. 5, 1934 |